US010771866B2

(12) United States Patent
Gupta et al.

(10) Patent No.: US 10,771,866 B2
(45) Date of Patent: Sep. 8, 2020

(54) METHODS, SYSTEMS, AND MEDIA SYNCHRONIZING AUDIO AND VIDEO CONTENT ON MULTIPLE MEDIA DEVICES

(71) Applicant: Google LLC, Mountain View, CA (US)

(72) Inventors: Nikita Gupta, Mountain View, CA (US); Kenneth MacKay, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/988,307

(22) Filed: May 24, 2018

(65) Prior Publication Data
US 2019/0364346 A1   Nov. 28, 2019

(51) Int. Cl.
*H04N 21/41* (2011.01)
*H04N 21/43* (2011.01)
(Continued)

(52) U.S. Cl.
CPC ..... *H04N 21/8547* (2013.01); *H04N 21/4307* (2013.01); *H04N 21/4394* (2013.01); *H04N 21/4402* (2013.01)

(58) Field of Classification Search
CPC ........... H04N 21/8547; H04N 21/4402; H04N 21/4394
See application file for complete search history.

(56) References Cited

U.S. PATENT DOCUMENTS

2007/0110074 A1   5/2007  Bradley et al.
2008/0147558 A1*  6/2008  Kraus .................... G06F 21/10
                                                                705/59

(Continued)

OTHER PUBLICATIONS

International Search Report and Written Opinion dated Jul. 22, 2019 in International Patent Application No. PCT/US2019/035502.

*Primary Examiner* — Hsiungfei Peng
(74) *Attorney, Agent, or Firm* — Byrne Poh LLP

(57) ABSTRACT

Methods, systems, and media for synchronizing audio and video content on multiple media devices are provided. In some embodiments, the method comprises: receiving, at a media device, an indication of a media content item to be presented using the media device, wherein the media device includes an audio component for presenting audio content associated with the media content item and a video component for presenting video content associated with the media content item; determining that the media device is associated with a group of media devices for presenting the media content item, wherein the group of media devices includes the media device and at least one audio device that presents the audio content associated with the media content item; generating an audio timestamp that controls the presentation of the audio content on the group of media devices; generating a video timestamp that control the presentation of the video content on the group of media devices; and causing, at the media device, the video content associated with the media content item to be presented using the generated video timestamp and causing the audio content associated with the media content item to be simultaneously presented by the at least one audio device in the group of media devices by transmitting the audio timestamp to the at least one audio device in the group of media devices.

19 Claims, 5 Drawing Sheets

(51) Int. Cl.
  *H04N 21/434*    (2011.01)
  *H04N 21/436*    (2011.01)
  *H04N 21/439*    (2011.01)
  *H04N 21/4402*   (2011.01)
  *H04N 21/472*    (2011.01)
  *H04N 21/81*     (2011.01)
  *H04N 21/8547*   (2011.01)

(56) References Cited

U.S. PATENT DOCUMENTS

| | | |
|---|---|---|
| 2008/0291863 A1 | 11/2008 | Agren |
| 2013/0340014 A1* | 12/2013 | Evans ................ H04N 21/6156 725/74 |
| 2014/0010515 A1 | 1/2014 | Lee et al. |
| 2014/0153909 A1* | 6/2014 | MacInnis ............ H04N 19/436 386/353 |
| 2015/0114574 A1* | 4/2015 | Fiedler .................... E05F 15/71 160/7 |
| 2015/0208161 A1* | 7/2015 | Lesaffre ............. H04N 21/4126 381/74 |
| 2015/0381343 A1 | 12/2015 | Le Nerriec et al. |
| 2018/0077443 A1 | 3/2018 | Lau et al. |

\* cited by examiner ately a video timestamp that control the presentation of the
METHODS, SYSTEMS, AND MEDIA SYNCHRONIZING AUDIO AND VIDEO CONTENT ON MULTIPLE MEDIA DEVICES

TECHNICAL FIELD

The disclosed subject matter relates to methods, systems, and media for synchronizing audio and video content on multiple media devices. More particularly, the disclosed subject matter relates to creating a group of multiple devices having video and/or audio playback capabilities to playback a media content item and synchronizing the playback of the video portions and the audio portions of the media content items on each of the multiple devices in the group.

BACKGROUND

With the increase in networked media devices, users are interested in combining multiple devices to view media content to create a richer media experience. For example, a user may be interested in viewing a video on a television device while routing the audio associated with the video to speakers associated with the television device as well as to other speakers in the same room as the television device to create a surround-sound experience. It can, however, be difficult to synchronize audio playback on the multiple speakers and it can also be difficult to synchronize the audio playback on the speakers with the video playback on the television device. Synchronization may be particularly difficult in cases where media content is streamed, for example, from a video sharing service, due to variations in network speed and quality during streaming.

Accordingly, it is desirable to provide new methods, systems, and media for synchronizing audio and video content on multiple devices.

SUMMARY

Methods, systems, and media for synchronizing audio and video content on multiple media devices are provided.

In accordance with some embodiments of the disclosed subject matter, a method for synchronizing audio and video content is provided, the method comprising: receiving, at a media device, an indication of a media content item to be presented using the media device, wherein the media device includes an audio component for presenting audio content associated with the media content item and a video component for presenting video content associated with the media content item; determining that the media device is associated with a group of media devices for presenting the media content item, wherein the group of media devices includes the media device and at least one audio device that presents the audio content associated with the media content item; generating an audio timestamp that controls the presentation of the audio content on the group of media devices; generating a video timestamp that control the presentation of the video content on the group of media devices; and causing, at the media device, the video content associated with the media content item to be presented using the generated video timestamp and causing the audio content associated with the media content item to be simultaneously presented by the at least one audio device in the group of media devices by transmitting the audio timestamp to the at least one audio device in the group of media devices.

In some embodiments, the video timestamp is based on the generated audio timestamp in response to setting the audio component of media device as a master device and the at least one audio device in the group of media devices as a follower device.

In some embodiments, the method further comprises determining whether to present the audio content of the media content item on the audio component of the media device and the at least one audio device.

In some embodiments, the method further comprises inhibiting the audio content associated with the media content item from being presented on the media device in response to determining that the audio content of the media content item is to be presented on the at least one audio device.

In some embodiments, the audio content is presented on the media device using the generated audio timestamp and wherein the audio timestamp is transmitted to the at least one audio device in response to determining that the audio content of the media content item is to be presented on the audio component of the media device and the at least one audio device.

In some embodiments, the method further comprises: receiving an indication of a change in playback of the media content item; and in response to receiving the indication of the change in playback, causing presentation of the video content associated with the media content item on the media device and the presentation of audio content associated with the media content item by the at least one audio device in the group of media devices to be modified based on the indication by generating an updated audio timestamp that is transmitted to the at least one audio device in the group of audio devices and by generating an updated video timestamp based on the updated audio timestamp.

In some embodiments, the change in playback of the media content item is a change in a playback position of the media content item.

In some embodiments, the change in playback of the media content item is a change in a volume of the audio content associated with the media content item.

In some embodiments, the audio timestamp is generated based on a current audio timestamp, a duration of time that has elapsed since presentation of the media content item began on the media device, and a sampling rate of the audio content associated with the media content item.

In some embodiments, the method further comprises: detecting a plurality of media devices having at least one of audio playback capabilities and video playback capabilities; and causing a user interface for selecting one or more of the plurality of detected media devices to be presented, wherein a subset of media devices that are selected from the plurality of media devices are placed in the group of media devices.

In accordance with some embodiments of the disclosed subject matter, a system for synchronizing audio and video content is provided, the system comprising a memory and a hardware processor coupled to the memory that is programmed to: receive, at a media device, an indication of a media content item to be presented using the media device, wherein the media device includes an audio component for presenting audio content associated with the media content item and a video component for presenting video content associated with the media content item; determine that the media device is associated with a group of media devices for presenting the media content item, wherein the group of media devices includes the media device and at least one audio device that presents the audio content associated with the media content item; generate an audio timestamp that controls the presentation of the audio content on the group of media devices; generate a video timestamp that control the presentation of the video content on the group of media devices; and cause, at the media device, the video content associated with the media content item to be presented using the generated video timestamp and cause the audio content associated with the media content item to be simultaneously presented by the at least one audio device in the group of media devices by transmitting the audio timestamp to the at least one audio device in the group of media devices.

In accordance with some embodiments of the disclosed subject matter, a non-transitory computer-readable medium containing computer executable instructions that, when executed by a processor, cause the processor to perform a method for synchronizing audio and video content is provided, the method comprising: receiving, at a media device, an indication of a media content item to be presented using the media device, wherein the media device includes an audio component for presenting audio content associated with the media content item and a video component for presenting video content associated with the media content item; determining that the media device is associated with a group of media devices for presenting the media content item, wherein the group of media devices includes the media device and at least one audio device that presents the audio content associated with the media content item; generating an audio timestamp that controls the presentation of the audio content on the group of media devices; generating a video timestamp that control the presentation of the video content on the group of media devices; and causing, at the media device, the video content associated with the media content item to be presented using the generated video timestamp and causing the audio content associated with the media content item to be simultaneously presented by the at least one audio device in the group of media devices by transmitting the audio timestamp to the at least one audio device in the group of media devices.

In accordance with some embodiments of the disclosed subject matter, a system for synchronizing audio and video content is provided, the system comprising: means for receiving, at a media device, an indication of a media content item to be presented using the media device, wherein the media device includes an audio component for presenting audio content associated with the media content item and a video component for presenting video content associated with the media content item; means for determining that the media device is associated with a group of media devices for presenting the media content item, wherein the group of media devices includes the media device and at least one audio device that presents the audio content associated with the media content item; means for generating an audio timestamp that controls the presentation of the audio content on the group of media devices; means for generating a video timestamp that control the presentation of the video content on the group of media devices; and means for causing, at the media device, the video content associated with the media content item to be presented using the generated video timestamp and means for causing the audio content associated with the media content item to be simultaneously presented by the at least one audio device in the group of media devices by transmitting the audio timestamp to the at least one audio device in the group of media devices.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1B:
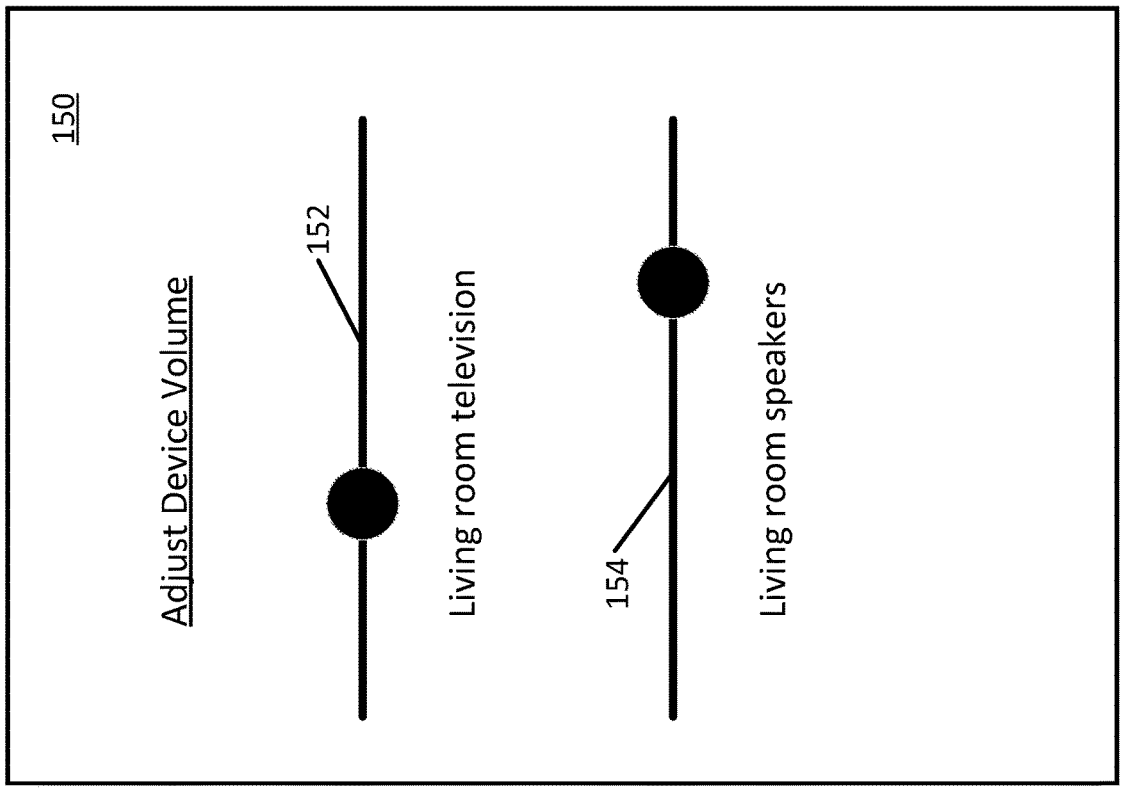
FIGS. 1A and 1B show examples of user interfaces for synchronizing media presentation devices in accordance with some embodiments of the disclosed subject matter.

In accordance with various embodiments, mechanisms (which can include methods, systems, and media) for synchronizing audio and video content on multiple media devices are provided.

In some embodiments, the mechanisms described herein can be used to synchronously present a media content item on a group of media devices, such as a media presentation device (e.g., a television, a projector, a digital media receiver, and/or any other suitable type of media presentation device) and one or more audio devices. For example, in some embodiments, a media presentation device can be a television in a particular room having video and audio playback capabilities (e.g., a living room television that is connected to a digital media receiver, a bedroom television, and/or any other suitable media presentation device), and audio devices included in the group of media devices can include one or more speakers, for example, speakers located in the same room as or in a nearby room as the display device (e.g., living room speakers, bedroom speakers, and/or any other suitable speakers), speakers connected on the same local area network, speakers that are connected to a digital media receiver, a set of at least two speakers in a stereo pair configuration, etc. In a more particular example, a display device can receive a media content item for playback via a media presentation device, such as a digital media receiver, that is connected to the display device, where the media presentation device can synchronize the presentation of audio content and/or video content on associated media devices, such as speakers that are grouped with the media presentation device.

In some embodiments, the mechanisms described herein can determine that a group of media devices is to be used to play back a selected media content item, where each media devices has particular audio and/or video capabilities. For example, the mechanisms can provide a user interface that allows a user to place multiple media devices into a group of media devices, such as a living room group that includes a digital media receiver (or any other suitable streaming media device) and an external speaker system. In continuing this example, in response to selecting a media content item for playback on a mobile device that is communicating with the digital media receiver, the mechanisms can determine that the digital media receiver belongs to a media group that includes associated media devices, such as a set of speakers in a stereo pair configuration for presenting the audio content of the selected media content item (e.g., where one speaker plays back a left channel audio signal and another speaker plays back a right channel audio signal). Based on the media group, the mechanisms can cause the video content of the selected media content item to be presented on a display device that is connected to the digital media receiver and can simultaneously cause the audio content of the selected media content item to be presented on at least the external speaker system (e.g., while inhibiting the audio content of the selected media content item from being presented on an audio component associated with the display device, while synchronizing the audio content of the selected media content item on both the audio component of the display device and the external speaker system).

In some embodiments, synchronous presentation of the media content item can include any suitable features. For example, in some embodiments, video content presented on the display device can be synchronized with audio content presented by one or more speaker devices in the group of media devices, where the display device is set as the master device and the audio signal is set as the master and the remaining media devices in the group of media devices are set as follower devices and where the video signal of the master device and the audio signal of the follower devices are synchronized to the audio signal of the master device. In continuing this example, the mechanisms can determine whether to present the audio content on the audio devices in the group of media device and the display device or whether to present the audio content on the audio devices and inhibit the presentation of audio content on the audio component of the display device.

In some embodiments, a viewer of the media content item can manipulate the playback of the media content item from the display device, the audio devices in the group of audio devices, and/or any suitable computing device connected to the display device or one of the audio devices. For example, a viewer can mute audio content from the display device and/or any of the audio devices in the group of audio devices. In another example, a viewer can fast-forward or rewind presentation of the media content item, and the mechanisms described herein can synchronously adjust presentation of the audio content and the video content from both the display device and the audio devices in the group of media devices. Techniques for adjusting and maintaining synchrony of presentation of the media content item are further described below in connection with FIGS. 1A, 1B, and 2.

In some embodiments, the mechanisms described herein can maintain synchrony of presentation of the media content item between the media presentation device and the one or more audio devices in the group of media devices using any suitable technique or combination of techniques. For example, in some embodiments, the mechanisms described herein can set an audio component associated with the media presentation device as a master device, where a video component associated with the media presentation device and each of the audio devices in the group of media devices can be set as follower devices to the master device. As a more particular example, in some embodiments, the mechanisms implemented on the media presentation device can calculate updated audio timestamps (e.g., based on a time since playback of the media content item began, based on a sampling rate of the audio content, and/or based on any other suitable information as described below in connection with FIG. 3), and can transmit the updated timestamps to the audio devices in the group of media devices, thereby ensuring that the audio content presented by both the media presentation device and the audio devices in the group of media devices are presented from the same timestamp. As another more particular example, in some embodiments, the mechanisms implemented on the media presentation device can calculate updated video timestamps (e.g., based on an updated audio timestamp, as described below in connection with FIG. 3), and can transmit the updated video timestamp to a video component of the media presentation device or the display device, thereby ensuring that video content presented from the display device corresponds to the audio content presented by at least the audio devices in the group of media devices.

Figure 1A:
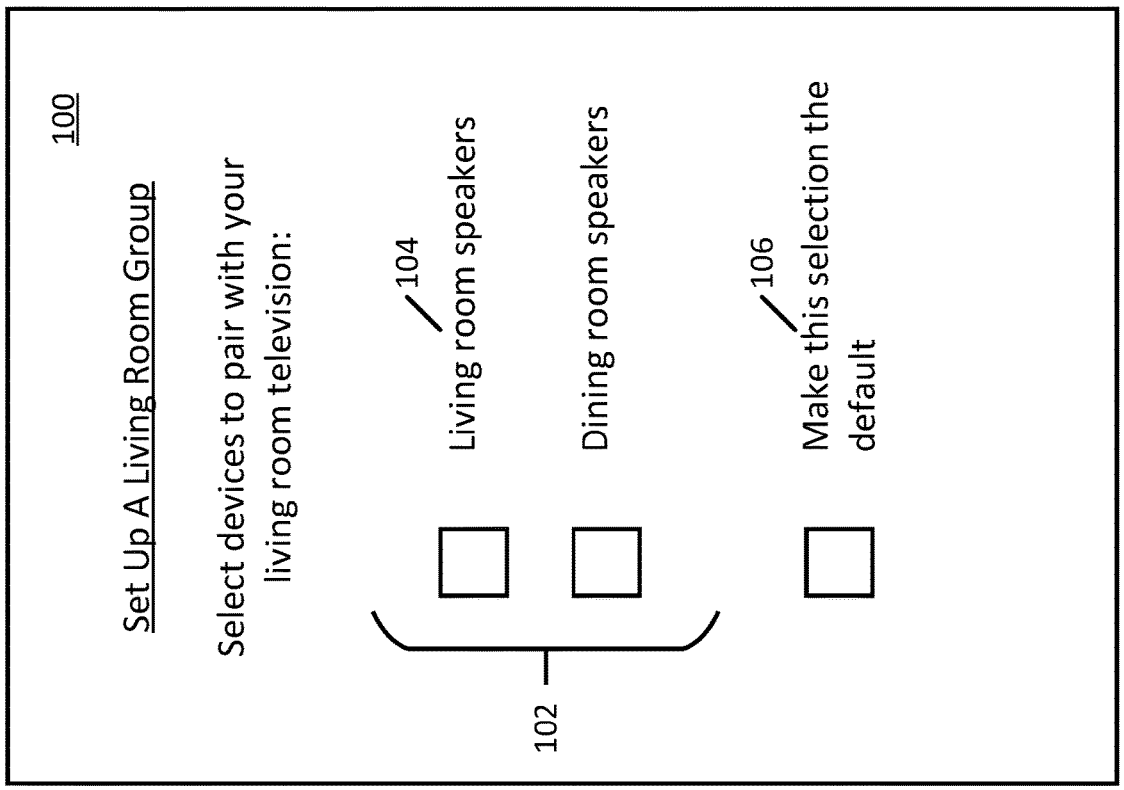

Turning to FIG. 1A, an example 100 of a user interface for initializing a group of media presentation devices to be synchronized is shown in accordance with some embodiments of the disclosed subject matter. In some embodiments, user interface 100 can be presented on any suitable device, such as a mobile phone, tablet computer, or wearable computer of a user initializing the devices, and/or any other suitable device. In some embodiments, user interface 100 can be presented in connection with any suitable application, for example, an application for controlling different devices (e.g., different media devices, smart devices such as a smart thermostat, and/or any other suitable devices) within a home of a user. In a more particular example, user interface 100 can be presented in response to executing the application on a device and selecting a "Create Group" option to place one or more media devices in a media group.

As illustrated, user interface 100 can be used to select multiple audio devices that are to be grouped with a media presentation device that plays audio and video content, such as a television or a display device that is connected to a streaming media device. For example, as shown in FIG. 1A, user interface 100 can be used to select speakers from group of speakers 102 to be grouped with a living room television that is connected to a streaming media device. In some embodiments, group of audio devices 102 can include any suitable number of individual speakers, such as living room speakers 104, dining room speakers, a set of stereo-paired speakers (e.g., where one speaker plays back a left channel audio signal and another speaker plays back a right channel audio signal), and/or any other suitable speakers.

It should be noted that, although FIG. 1A presents a list of two audio devices to select for grouping with a media presentation device, this is merely illustrative. Any suitable media device having audio and/or video playback capabilities can be included in listing 102. For example, listing 102 can include multiple external speaker systems that are located proximal to media presentation device, multiple media presentation devices that are each connected to display device, multiple media receiver devices that are each connected to a speaker device, multiple computing devices having audio and/or video playback capabilities, etc.

In some embodiments, user interface 100 can be presented in response to detecting media devices (e.g., one or more media devices having audio and video playback capabilities and one or more audio devices having only audio playback capabilities) that are connected to a local area network (e.g., the same Wi-Fi network). Alternatively, in response to selecting a user interface element on user interface 100, a device information query can be transmitted that waits for responses from media devices on the local area network, where the responses include, for example, a device identifier, device capability information, network information, etc. Such responses can be used to populate the list of media devices for placing in a media group within user interface 100.

Note that, in some embodiments, a television and each of the audio devices can be connected in any suitable manner. For example, in some embodiments, each device can be connected to a Wi-Fi network within a home of the user. As another example, in some embodiments, each device can communicate with other devices using BLUETOOTH communication, and/or in any other suitable manner. In another example, in some embodiments, a wireless connection can be established between a computing device and an audio device, such as an ad hoc wireless network connection, a short-range wireless communication protocol (e.g., Bluetooth, Bluetooth Low Energy, Wireless USB, etc.), etc. Note that, in some embodiments, a device can be connected to a Wi-Fi network directly or via a streaming media interface that is connected (e.g., via an HDMI connection, and/or connected in any other suitable manner) to the device.

In some embodiments, user interface 100 can include an indicator that indicates whether a particular media device is currently connected to a communications network and available for selection. For example, an indicator adjacent to an audio device identifier can indicate that the audio device is currently connected to a local area network and is available for inclusion within a media group (e.g., a "movies in my living room" media group). In another example, a representation of a device identifier can be modified to indicate that the media device was previously detected on a local area network but is not currently detected and, accordingly, not available for placement into a media group. In yet another example, a representation of a device identifier can be modified to indicate a suggested media device for placement into a media group (e.g., based on previous group settings, based on proximity to a display device, based on location information, based on device information, etc.).

In some embodiments, user interface 100 can include a default selection 106. In some embodiments, selection of default selection 106 can cause a selected audio device from group of audio devices 102 to be grouped with a particular media presentation device (e.g., a living room television that is connected to a media streaming device, as shown in FIG. 1A) for future presentations of media content, by default. For example, in some embodiments, selection of default selection 106 can cause audio content associated with a media content item that is presented on a living room television to be synchronously presented using a selected speaker from group of audio devices 102.

In some embodiments, multiple groups of media devices can be created. For example, using user interface 100, a user can input a group name and select particular media devices for association with the group name. In a more particular example, a "movie" media group can be created with particular video devices and particular audio devices for playing back movie content. In another more particular example, a "late night" media group can be created with particular video devices and particular audio devices for playing back media content after a particular time (e.g., use this media group after 9 PM when the user's children are typically asleep). In yet another example, in response to determining device capability information from each of the connected media devices, a list of suggested groups can be presented in user interface 100 (e.g., a suggested group of media devices for watching horror movies, a group of audio devices for a first video device and a different group of audio devices for a second video device, etc.).

Turning to FIG. 1B, an example 150 of a user interface for adjusting volume on grouped audio devices is shown in accordance with some embodiments of the disclosed subject matter. In some embodiments, user interface 150 can be presented on any suitable device, such as a mobile device (e.g., a mobile phone, a tablet computer, a wearable computer, and/or any other suitable mobile device) that can be used for initiating and/or controlling playback of media content on a media playback device. Note that, in some embodiments, user interface 150 can be presented in connection with any suitable application executing on the device, such as an application for controlling various devices within a home of a user, an application for initiating and/or controlling playback of media content (e.g., an application associated with a video sharing service, and/or any other suitable application), and/or any other suitable application.

As illustrated, in some embodiments, user interface 150 can include user interface controls to adjust a volume of audio devices in a grouping. For example, in an instance where a living room television and living room speakers are grouped together, user interface 150 can present user interface controls to adjust a volume of the living room television and a volume of the living room speakers. As a more particular example, user interface 150 can include volume adjustment sliders 152 and 154, as shown in FIG. 1B, to adjust a volume of the living room television and a volume of the living room speakers, respectively. Note that, in some embodiments, adjustment of a volume (or muting a sound output) of any devices grouped together can cause the volume to be adjusted, as described below in more detail in connection with FIG. 2.

Figure 2:
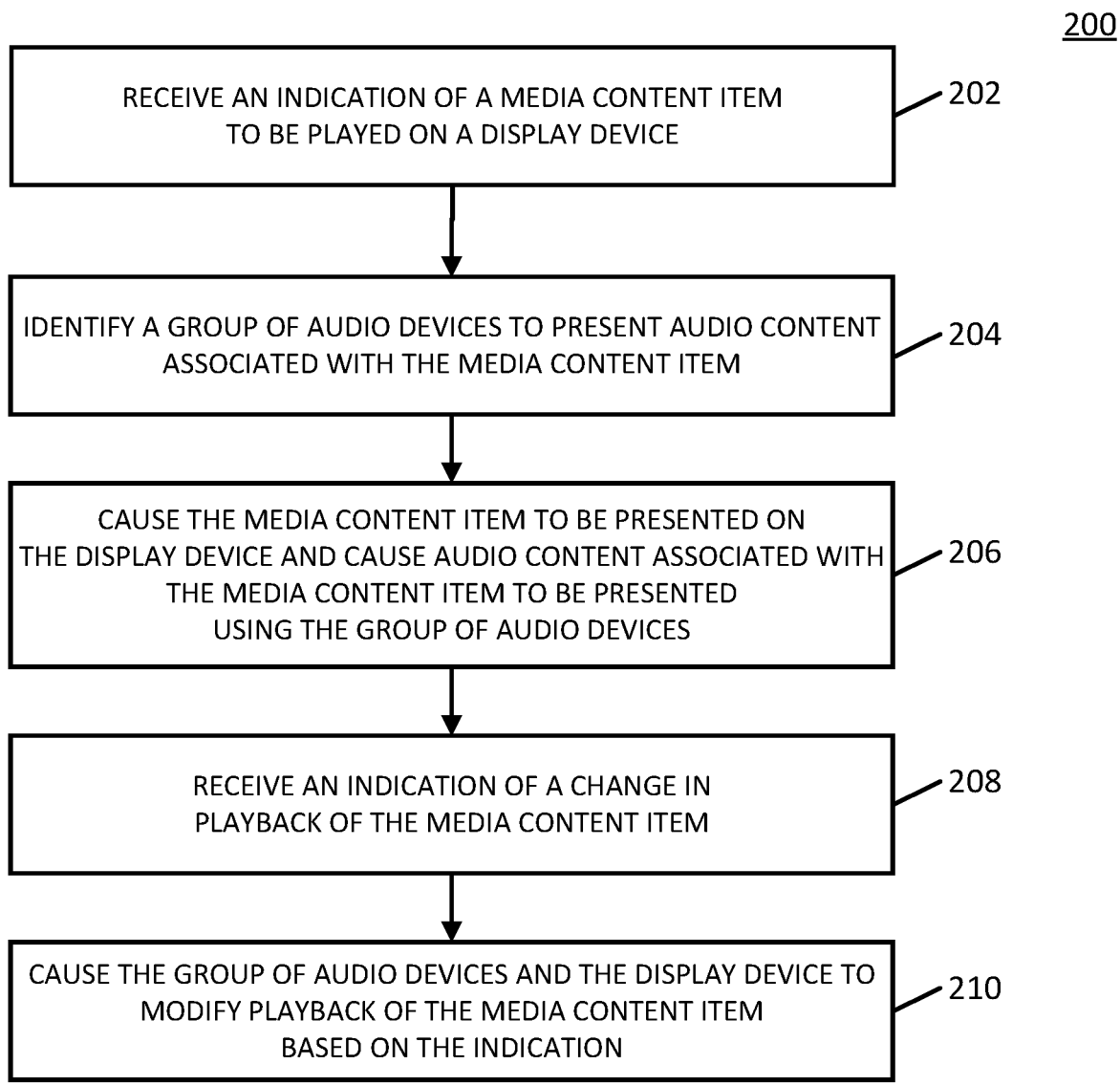
FIG. 2 shows an example of a process for presenting synchronized audio and video content on multiple devices in accordance with some embodiments of the disclosed subject matter.

Turning to FIG. 2, an example 200 of a process for synchronizing video and audio content is shown in accordance with some embodiments of the disclosed subject matter. In some embodiments, process 200 can be implemented by a user device, such as a television, that is presenting media content. Additionally or alternatively, in some embodiments, process 200 can be implemented by a streaming media interface that is connected to a media playback device (e.g., a television) in any suitable manner (e.g., an HDMI connection, and/or any other suitable type of connection).

Process 200 can begin at 202 by receiving an indication of a media content item to be presented. In some embodiments, process 200 can receive the indication in any suitable manner. For example, in some embodiments, process 200 can receive the indication based on an input from a user device (e.g., a mobile phone, a tablet computer, a laptop computer, and/or any other suitable type of user device) that indicates that the media content item is to be presented on a particular display device (e.g., a television, and/or any other suitable type of media playback device). In some embodiments, the media content item can be any suitable type of media content, such as a video, a television program, a movie, and/or any other suitable type of media content.

At 204, process 200 can identify a group of devices from which to present audio content associated with the media content item. For example, process 200 can determine whether the display device is associated with a group of media devices. In a more particular example, as shown in and described above in connection with FIG. 1A, in an instance where the media content item is to be presented on a particular display device, such as a living room television, process 200 can identify any suitable devices that have been grouped with the living room television, such as living room speakers (e.g., a set of speakers in a stereo-pair configuration).

In some embodiments, process 200 can identify media devices to play audio content based on an explicit grouping by a user, as shown in and described above in connection with FIG. 1A. Additionally or alternatively, in some embodiments, process 200 can identify available devices using any suitable device discovery methods. For example, in some embodiments, process 200 can identify one or more devices capable of presenting audio content that are currently connected to a particular network (e.g., a Wi-Fi network to which the media playback device is connected, and/or any other suitable type of network), and can present a user interface that allows a user to select any of the identified devices for presentation of audio content associated with the media content item indicated at 202.

It should be noted that, in some embodiments, in response to creating a group of media devices, process 200 can configure the media device in order to synchronize the audio content and the video content across the media devices in the group. For example, process 200 can begin by turning off synchronization features associated with the media playback device. In a more particular example, process 200 can determine that the media playback device includes synchronization features in which the media playback device sets a video component, such as a video pipeline, as the master and, in response, process 200 can disable the synchronization features of the media playback device. In turn, process 200 can set the media playback device as the master device and the audio component, such as the audio pipeline, of the media playback device as the master and can set the remaining media devices in the group of media devices as follower devices, where the video signal of the master device and the audio signal of the follower devices are synchronized to the audio signal of the master device. As described further below, the media playback device can determine audio timestamps and transmit the audio timestamps to the follower devices and the media playback device can also determine video timestamps that are based on the determined audio timestamps for use by the video component of the master device (e.g., a video buffer).

It should be noted that, in some embodiments, the media playback device can determine video timestamps and can also determine audio timestamps that are based on the determined video timestamps for transmission to audio components of the follower devices and/or the audio component of the media playback device.

At 206, process 200 can cause video content of the media content item to be presented on the display device and can cause audio content to be presented on at least the audio devices grouped with the display device (e.g., as described above in connection with 204). In some embodiments, process 200 can inhibit the audio component of the display device from presenting the audio content (e.g., as the audio capabilities of each of the grouped audio devices is greater than the audio capabilities of the audio component in the display device). For example, process 200 can cause the audio signal and audio timestamps generated by the audio component of the display device to be synchronized with the video content presented by the display device as well as with the audio content presented by the one or more devices grouped with the display device. For example, in some embodiments, process 200 can perform any suitable technique or combination of techniques (as described below in more detail in connection with FIG. 3) to cause the audio content to be synchronized across the grouped media devices and to cause the video content to be synchronized with the audio content.

In some embodiments, process 200 can initiate presentation of the media content item on the display in any suitable manner. For example, in some embodiments, process 200 can receive a selection of a particular media content item that is to be presented on the display device from a user device (e.g., a mobile phone, a tablet computer, and/or any other suitable user device), as described above in connection with 202. Note that, in some embodiments, the selection can be received by a streaming media interface coupled to the display device (e.g., via an HDMI connection, and/or connected in any other suitable manner). In some embodiments, in response to receiving a selection of the media content item, the display device and/or the streaming media interface coupled to the display device can request the media content item (e.g., from a video sharing service, from a streaming video content service, and/or from any other suitable location). As a more particular example, in some embodiments, the display device and/or the streaming media interface connected to the display device can requires the media content item from a video sharing service using a Universal Resource Locator (URL) or other identifier associated with the media content item. As another example, in some embodiments, video content and/or audio content associated with a media content item selected on a user device can be transmitted to the display device and/or to a streaming media interface connected to the display device. As a more particular example, in some embodiments, a media content item selected on the user device can be presented on both the user device and the display device.

In some embodiments, process 200 can cause audio content associated with the media content item to be presented on the one or more audio devices grouped with the media playback device using any suitable technique or combination of techniques. For example, in some embodiments, process 200 can cause an instruction to be transmitted to a streaming media interface connected to each of the one or more devices that indicate the media content item (e.g., by URL, and/or in any other suitable manner) that cause the audio content to be presented. As a more particular example, in some embodiments, the instruction can be transmitted from the display device and/or from a streaming media interface connected to the display device to each of the audio devices in the group of audio devices.

Note that, in some embodiments, process 200 can cause a first channel of audio content to be presented by a first audio device in the group of audio devices and can cause a second channel of audio content to be presented by a second audio device in the group of audio devices. For example, in some embodiments, process 200 can cause a left channel of audio content to be presented by a left speaker in the group of audio devices and can cause a right channel of audio content to be presented by a right speaker in the group of audio devices, thereby creating a richer sound experience. In another particular example, in user interface 100 of FIG. 1A, process 200 can receive an indication from a user to set a first speaker to output a left channel of audio content and a second speaker to output a right channel of audio content. In some embodiments, the display device and/or a streaming media interface connected to the display device can transmit instructions to each audio device indicating a particular channel of audio content that is to be presented by the audio device.

At 208, process 200 can receive an indication of a change in playback of the media content item. For example, the change in playback can correspond to pausing the media content item, changing a playback position of the media content item (e.g., rewinding or skipping ahead in presentation of the media content item), muting audio content associated with the media content item, adjusting volume of one or more devices presenting audio content associated with the media content item, and/or any other suitable adjustment in playback. In some embodiments, process 200 can receive the indication in any suitable manner and from any suitable device. For example, as shown in and described above in connection with FIG. 1B, process 200 can receive the indication from a user device (e.g., a mobile phone, a tablet computer, a wearable computer, and/or any other suitable device). As a more particular example, in some embodiments, the indication can be received via a user interface that is presented in connection with an application for controlling different devices within a home of a user and/or in connection with an application for initiating and controlling playback of media content.

At 210, process 200 can cause the display device and/or the group of media devices grouped with the display device to modify the playback of the media content item based on the received indication. For example, in an instance where the indication is to pause presentation of the media content item, process 200 can cause video content and audio content associated with the media content item to be paused on all media devices. As another example, in an instance where the indication is to rewind or skip ahead within the media content item, process 200 can cause the display device and the audio devices grouped with the display device to change a presentation time point based on the indication such that the video content and the audio content change to the indicated time point. As yet another example, in an instance where the indication is to mute audio content, process 200 can cause audio content from both the display device and the audio devices grouped with the display device to be muted. As still another example, in an instance where the indication is to mute audio content from a particular device (e.g., from the display device, from a particular speaker associated with the display device, and/or any other suitable device), process 200 can cause audio content from the indicated device to be muted. As still another example, in an instance where the indication is to adjust a volume of audio content from a particular device, process 200 can cause audio content from the indicated device to be raised and/or lowered in volume based on the indication.

Figure 3:
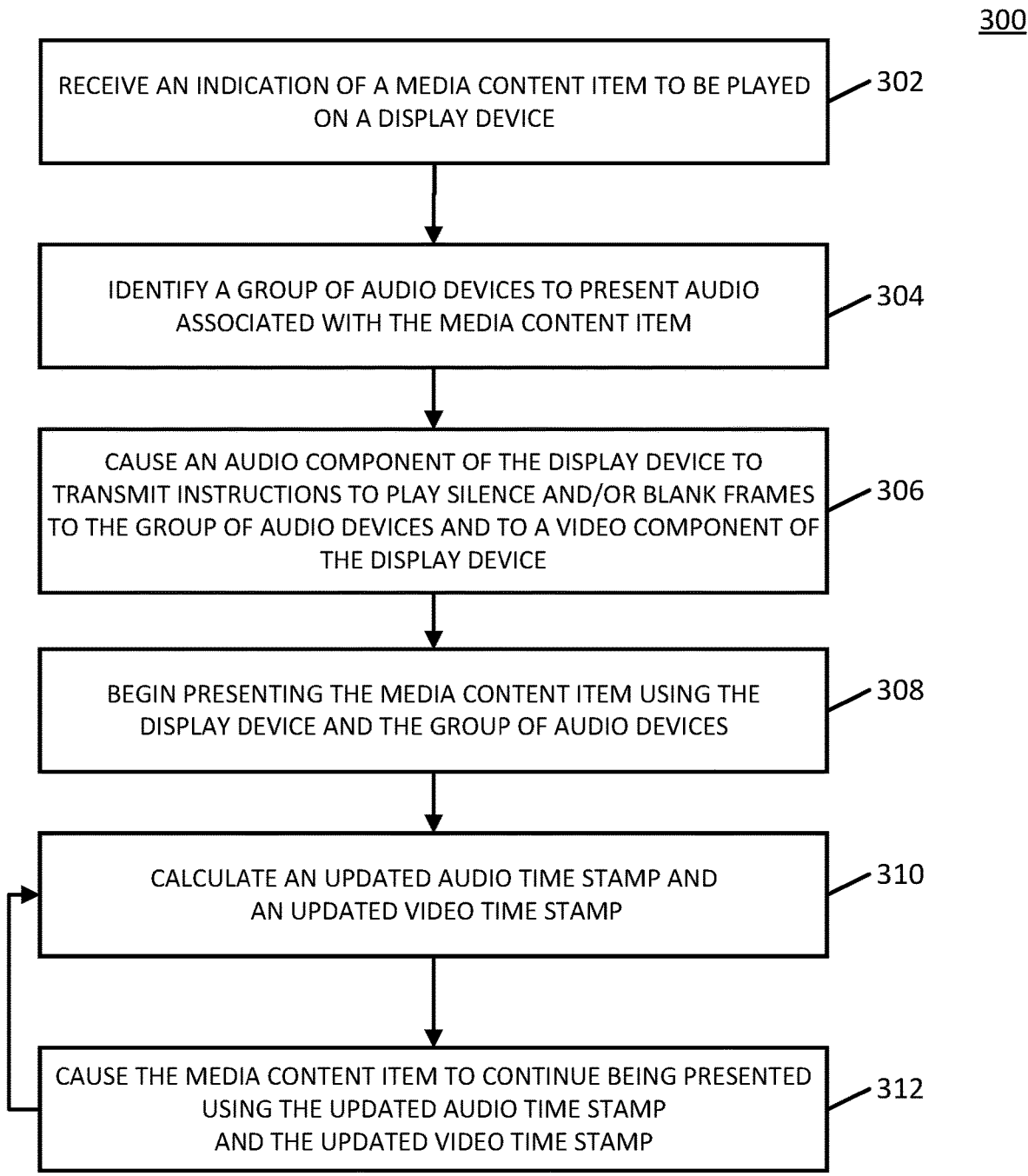
FIG. 3 shows an example of a process for synchronizing multiple audio devices with a video device in accordance with some embodiments of the disclosed subject matter.

Turning to FIG. 3, an example 300 of a process for adjusting timestamps of audio content and video content to maintain synchrony of media content presentation is shown in accordance with some embodiments of the disclosed subject matter. In some embodiments, blocks of process 300 can be executed by a display device presenting a media content item that is serving as a master device for one or more other audio devices that are presenting audio content associated with the media content item in synchrony with the display device. For example, in some embodiments, the display device can be a television, a tablet computer, a laptop computer, a game console, a media player, and/or any other suitable display device for presenting media content. Additionally or alternatively, in some embodiments, blocks of process 300 can be executed by a streaming media interface that is connected to a display device (e.g., via an HDMI connection, and/or any other suitable type of connection), as described above in connection with FIG. 2. Additionally, note that, blocks of process 300 describe an audio component and a video component of a display device or of a streaming media interface connected to a display device. In some such embodiments, the audio component and/or the video component can correspond to any suitable hardware components of the display device or of a streaming media interface connected to the display device.

Process 300 can begin at 302 by receiving an indication of a media content item to be presented on the display device. In some embodiments, process 300 can receive the indication in any suitable manner. For example, in some embodiments, process 300 can receive a selection of a particular media content item from a group of available media content items via a selection of a selectable input that represents the particular media content item. In some such embodiments, the selection can be received in any suitable manner. For example, in some embodiments, the selection can be received via a remote. As another example, in some embodiments, the selection can be received via a user device that transmits an indication of the selected media content item to a streaming media interface connected to the display device.

Note that, in some embodiments, the selected media content item can be any suitable type of media content. For example, in some embodiments, the media content item can be a video, a television program, a movie, a song, live-streaming video content, and/or any other suitable type of media content item. As another example, in some embodiments, the selected media content item can be a playlist of other collection of media content items.

At 304, process 300 can identify a group of audio devices to present audio content associated with the selected media content item. In some embodiments, the group of audio devices can include any suitable audio devices, such as speakers. In some embodiments, process 300 can identify the group of audio devices using any suitable technique or combination of techniques. For example, in some embodiments, process 300 can identify a group of audio devices that have been grouped with the display device, as described above in connection with FIG. 1A and FIG. 2. As a more particular example, in some embodiments, the group of audio devices can be audio devices that have been explicitly grouped with the display device by a user of the display device, such as a living room speaker or a pair of living room speakers that have been grouped with a living room television. As another more particular example, in some embodiments, the group of audio device can be audio devices that have been detected in proximity to the display device (e.g., based on a similar location of the audio devices and the display device, such as within the same room of a house) and that have been automatically grouped with the display device.

At 306, process 300 can cause an audio component of the display device or an audio component of a streaming media interface connected to the display device to serve as a master device for coordinating synchronous presentation of the media content item using the display device and the group of audio devices. For example, in some embodiments, the audio component can, at 306, transmit instructions to the group of audio devices to present silent frames for a predetermined duration of time and/or until particular criteria are satisfied (e.g., a predetermined amount of the media content item is buffered by the display device, and/or any other suitable criteria). As another example, in some embodiments, the audio component can transmit instructions to a video component of the display device to present blank frames for a predetermined duration of time and/or until particular criteria are satisfied (e.g., a predetermined amount of the media content item is buffered by the display device).

At 308, process 300 can cause the media content item to begin being presented in a synchronized manner using the display device and the group of audio devices. In some embodiments, process 300 can begin synchronous presentation of the media content item in response to determining that any suitable criteria have been satisfied (e.g., that a predetermined amount of the media content item has been buffered by the display device, and/or any other suitable criteria). In some embodiments, synchronous presentation of the media content item using the display device and the group of audio devices can include any suitable features, as described above in more detail in connection with FIG. 2. For example, in some embodiments, synchronous presentation of the media content item can include synchronized presentation of audio content associated with the media content item between an audio component of the display device (e.g., the audio pipeline of the display device) and the group of audio devices. As another example, in some embodiments, synchronous presentation of the media content item can include synchronized presentation of video content associated with the media content item between a video component of the display device and audio content associated with the media content item that is presented by the audio devices in the group of audio devices and/or an audio component of the display device. In some embodiments, initialization of presentation of the media content item can be associated with an initial audio timestamp and an initial video timestamp.

At 310, process 300 can calculate an updated audio timestamp and an updated video timestamp for presentation of the media content item. In some embodiments, the updated audio timestamp and the updated video timestamp can be calculated by an audio component of the display device, which can serve as a master device, and the video component of the display device and the group of audio devices can serve as follower devices. In some embodiments, process 300 can calculate the updated audio timestamp and the updated video timestamp using any suitable information and/or any suitable technique(s). For example, in some embodiments, process 300 can calculate the updated audio timestamp based on a number of audio samples that have been presented since a start of presentation of the media content item, a sampling rate of the audio content, and/or any other suitable information. As a more particular example, in some embodiments, an updated audio timestamp can be calculated as:

new_audio_pts=<number of audio samples since start of playback>/<sampling rate>.

In some embodiments, the updated video timestamp can be calculated based on the updated audio timestamp, calculated as described above. For example, in some embodiments, the updated video timestamp can be calculated based on a previous video timestamp and a difference between the updated audio timestamp and a previous audio timestamp. As a more particular example, in some embodiments, an updated video timestamp can be calculated as:

new_video_pts=old_video_pts+(new_audio_pts−old_audio_pts), where old_audio_pts can be a previous audio timestamp prior to the new_audio_pts calculation.

It should be noted that, in some embodiments, process 300 can calculate an updated video timestamp based on the start of the presentation of the media content item and can calculate an updated audio timestamp based on the updated video timestamp. For example, in some embodiments, the updated audio timestamp can be calculated based on a previous audio timestamp and a difference between the updated video timestamp and a previous video timestamp.

At 312, process 300 can cause the media content item to continue being presented synchronously between the display device and the group of audio devices using the updated audio timestamp and the updated video timestamp. For example, in some embodiments, process 300 can transmit an indication of the updated audio timestamp to each audio device in the group of audio devices in connection with instructions that cause each audio device in the group of audio devices to present audio content from the updated audio timestamp. Note that, in some embodiments, based on a value of the updated audio timestamp, the instructions can cause the audio devices in the group of audio devices to repeat audio samples or skip audio samples. As another example, in some embodiments, process 300 can transmit an indication of the updated video timestamp to a video component of the display device in connection with instructions that cause the video component to present video content from the updated video timestamp. Note that, in some embodiments, based on a value of the updated video timestamp, the instructions can cause the video component of the display device to repeat video frames or skip video frames.

Process 300 can then loop back to 310 and calculate an updated audio timestamp and an updated video stamp, which can then be used at block 312 to cause the media content item to continue being presented synchronously using the display device and the group of audio devices.

Note that, in some embodiments, process 300 can maintain synchronous presentation of the media content item between the display device and the group of audio devices by manipulating a clock rate of the audio and video components of the display devices and/or a clock rate of audio devices in the group of audio devices rather than by calculating and transmitting updated timestamps from an audio component of the display device to a video component of the display device and the audio devices in the group of audio devices, as described above. For example, in some such embodiments, process 300 can modify clock pulses using any suitable hardware associated with the display device to maintain synchrony across devices.

Figure 4:
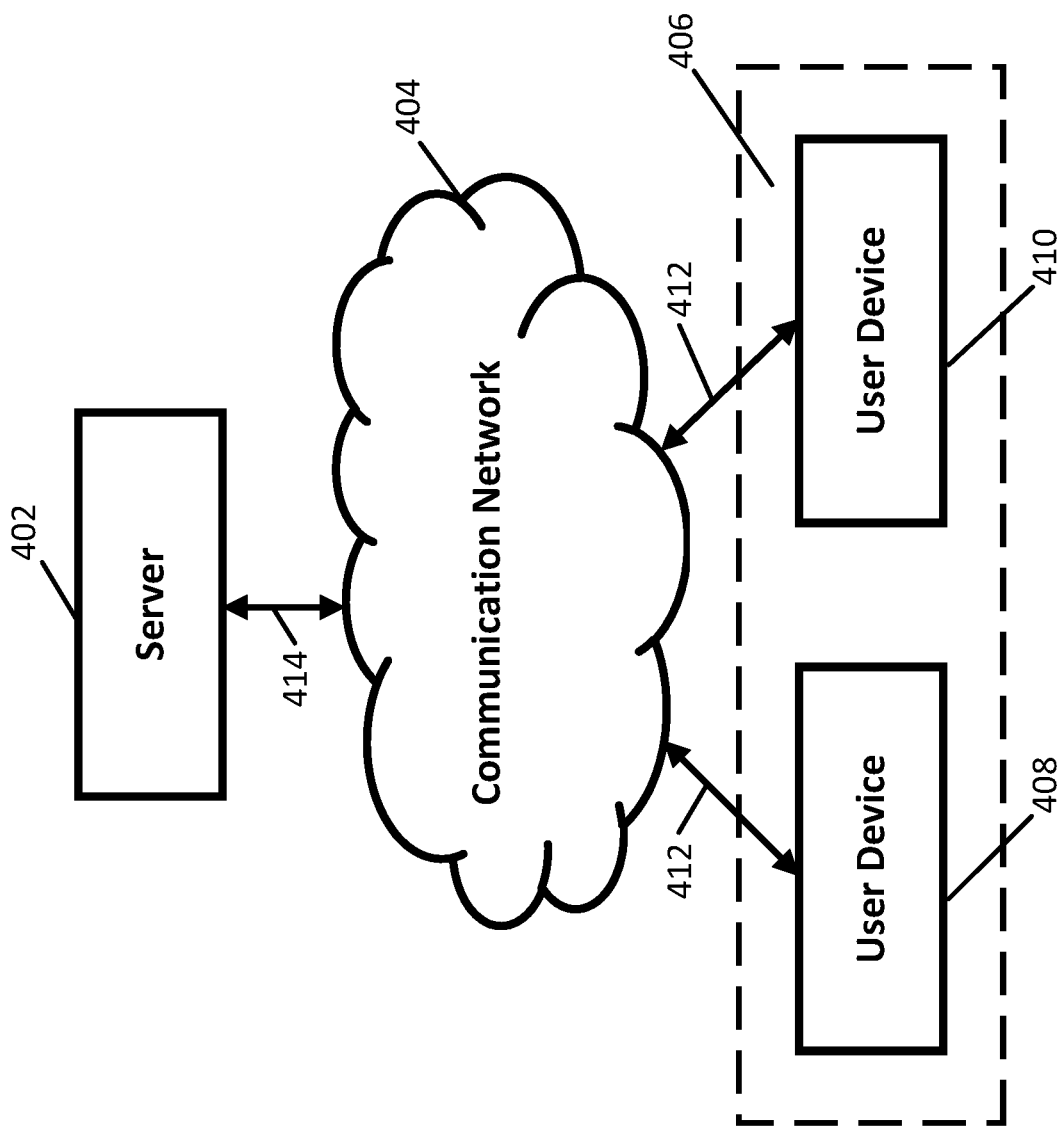
FIG. 4 shows a schematic diagram of an illustrative system suitable for implementation of mechanisms described herein for synchronizing audio and video content in accordance with some embodiments of the disclosed subject matter.

Turning to FIG. 4, an example 400 of hardware for synchronizing audio and video content that can be used in accordance with some embodiments of the disclosed subject matter is shown. As illustrated, hardware 400 can include a server 402, a communication network 404, and/or one or more user devices 406, such as user devices 408 and 410.

Server 402 can be any suitable server(s) for storing information, data, and/or media content. For example, in some embodiments, server 402 can store media content items, which can be transmitted to user devices 406 for presentation. In some such embodiments, the media content items can include any suitable types of media content, such as videos, movies, television programs, live-streamed content, audio content (e.g., music, audiobooks, radio programs, and/or any other suitable audio content), and/or any other suitable type of media content. In another example, in some embodiments, server 402 can determine timestamp information based on current audio timestamp information, a duration of time that has elapsed since presentation of the media content item began on a user device 406, and a sampling rate of the audio content associated with the media content item and transmit the determined timestamp information to user devices 406.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for presenting video content and/or audio content. For example, in some embodiments, user devices 406 can include a television, speakers, a mobile phone, a tablet computer, a media player, a desktop computer, a vehicle entertainment system, a wearable computer, and/or any other suitable type of user device.

In a more particular example, user device 408 can be a media presentation device, such as a digital media receiver or media streaming device that is connected to a display device, where the media presentation device connected to the display device have video playback capabilities and audio playback capabilities, and user device 410 can be a speaker device that has audio playback capabilities. In this example, user device 408 and user device 410 can be connected over communication network 404, such as a wireless local area network.

In some embodiments, user device 408 can be a media presentation device, such as a digital media receiver or media streaming device that is connected to a display device. Media presentation device can be any suitable device, such as a smartphone, a tablet computer, a wearable computer, a laptop computer, a personal computer, an electronic reader, a digital media receiver, a smart television, a game console, any other suitable computing device, or any suitable combination thereof. For example, the media presentation device can request media content items from a content server 420 and can direct playback of a media content item to begin on a connected display device (e.g., a television device that a digital media receiver device is connected).

In continuing this example, the media presentation device can include backend components that are configured to handle video and audio synchronization, where the video component of the media presentation device is set as the master device.

In some implementations, the media presentation device can be coupled to a user device using a communications link 412. The user device can be any suitable device, such as a smartphone, a tablet computer, a wearable computer, a laptop computer, a personal computer, an electronic reader, a digital media receiver, a smart television, a game console, any other suitable computing device, or any suitable combination thereof. In some implementations, communications link 412 can include any suitable communications link. Additionally, communications link 412 can include a network, such as a local area network (LAN) having wired and/or wireless connections. Additionally or alternatively, communications link 412 can include a wireless connection between the media presentation device and the user device, such as an ad hoc wireless network connection, a short-range wireless communication protocol (e.g., Bluetooth, Bluetooth Low Energy, Wireless USB, etc.), etc. In some implementations, communications between the media presentation device and the user device over communications link 412 can be encrypted using any suitable encryption technique(s). For example, messages sent from the user device, such as a mobile device, to the media presentation device can be encrypted using any suitable encryption scheme, for example, using a public key-private key pair for encryption and decryption of messages. As another example, communications over communications link 412 can be encrypted using Transport Layer Security (TLS).

In some embodiments, in implementations where user device 410 is an external sound system including a speaker, the external sound system can be any suitable device that can receive an audio signal and output the audio signal (potentially through one or more intermediate devices) to one or more speakers. For example, the external sound system can be an audio/video (AV) receiver, a speaker, an amplifier, an audio switch, an HDMI switch, any other suitable external sound system and/or any suitable combination thereof. More particularly, the external sound system can include speakers, hardware and/or software for rendering media content such as analog and/or digital audio and/or video data, a power supply, etc. The external sound system can include various input ports for receiving audio and/or video data from various sources. Such input ports can include one or more HDMI ports, one or more component video ports, one or more composite video ports, one or more USB ports, one or more S-Video ports, one or more TOSLINK ports, one or more coaxial ports, one or more Ethernet ports (whether wired or wireless), etc. Additionally or alternatively, in some implementations, the external sound system can be configured to receive audio over any suitable wireless connection, such as over a connection to a local area network (e.g., via a connection that complies with one of the IEEE 802.11x family of protocols which are sometimes referred to as Wi-Fi connections), or a wireless connection between the external sound system and user device 308 (e.g., a digital media receiver), such as an ad hoc wireless network connection, a short-range wireless communication protocol (e.g., Bluetooth, Bluetooth Low Energy, Wireless USB, etc.), etc.

In some embodiments, user device 408, such as a media presentation device or a media receiver device, can determine, via device discovery requests, that user devices 410 are multiple speakers within a particular proximity of user device 408 that have desirable audio playback capabilities in comparison with user device 408 having desirable video playback capabilities (e.g., a display having a particular resolution, a display having particular dimensions, etc.) and undesirable audio playback capabilities.

Although server 402 is illustrated as one device, the functions performed by server 402 can be performed using any suitable number of devices in some embodiments. For example, in some embodiments, multiple devices can be used to implement the functions performed by server 402. In a more particular example, a first server can be implemented for handling device discovery and a second server can be implemented for transmitting media content items.

Although two user devices 408 and 410 are shown in FIG. 4 to avoid over-complicating the figure, any suitable number of user devices, and/or any suitable types of user devices, can be used in some embodiments.

Figure 5:
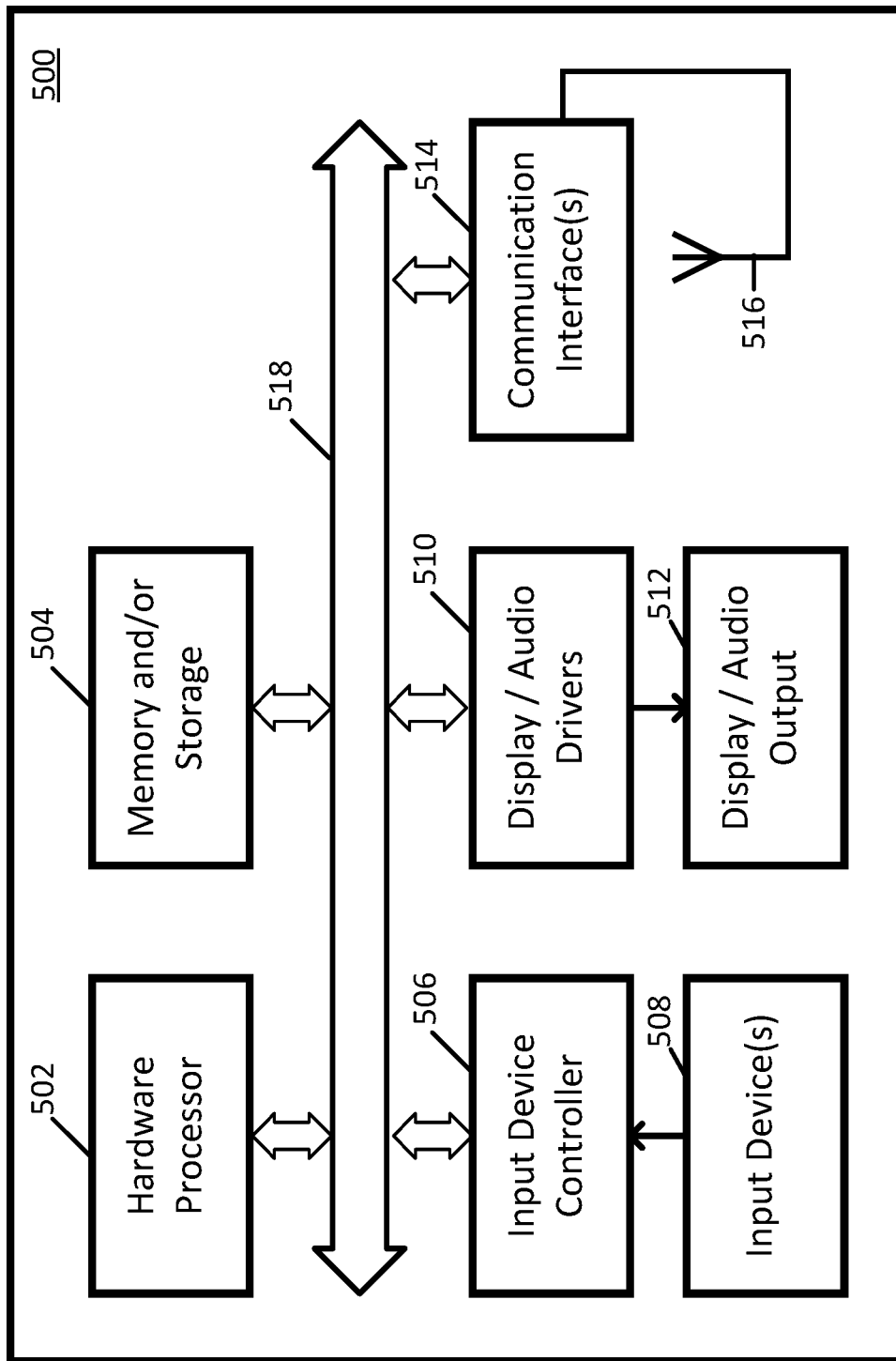
FIG. 5 shows a detailed example of hardware that can be used in a server and/or a user device of FIG. 4 in accordance with some embodiments of the disclosed subject matter.

Server 402 and user devices 406 can be implemented using any suitable hardware in some embodiments. For example, in some embodiments, devices 402 and 406 can be implemented using any suitable general purpose computer or special purpose computer. For example, a mobile phone may be implemented using a special purpose computer. Any such general purpose computer or special purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 502 can be controlled by a server program stored in memory and/or storage of a server, such as server 502. For example, in some embodiments, the server program can cause hardware processor 502 to transmit a requested media content item to user device 406 via communication network 404, and/or perform any other suitable functions. In some embodiments, hardware processor 502 can be controlled by a computer program stored in memory and/or storage 504 of user device 406. For example, the computer program can cause hardware processor 502 to identify one or more audio devices (e.g., speakers, and/or any other suitable audio device) from which audio content associated with a media content item is to be presented and can cause the audio content from the audio device to be synchronized with audio and video content presented from user device 406, and/or perform any other suitable functions.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks (e.g., computer network 404). For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 416 can be omitted.

Bus 518 can be any suitable mechanism for communicating between two or more components 502, 504, 506, 510, and 514 in some embodiments.

Any other suitable components can be included in hardware 400 in accordance with some embodiments.

In some embodiments, at least some of the above described blocks of the processes of FIGS. 2 and 3 can be executed or performed in any order or sequence not limited to the order and sequence shown in and described in connection with the figures. Also, some of the above blocks of FIGS. 2 and 3 can be executed or performed substantially simultaneously where appropriate or in parallel to reduce latency and processing times. Additionally or alternatively, some of the above described blocks of the processes of FIGS. 2 and 3 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for synchronizing audio and video content on multiple devices are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for synchronizing audio and video content, the method comprising:

receiving, at a media device, an indication of a media content item to be presented using the media device, wherein the media device includes an audio component for presenting audio content associated with the media content item and a video component for presenting video content associated with the media content item;

determining that the media device is associated with a group of media devices for presenting the media content item, wherein the group of media devices includes the media device and at least one audio device that presents the audio content associated with the media content item;

generating, by the media device, an audio timestamp that controls the presentation of the audio content on the group of media devices;

generating, by the media device, a video timestamp that controls the presentation of the video content on the media device based on the generated audio timestamp in response to setting the audio component of the media device as a master device and the at least one audio device in the group of media devices as a follower device; and causing, at the media device, the video content associated with the media content item to be presented using the generated video timestamp and causing the audio content associated with the media content item to be simultaneously presented by the at least one audio device in the group of media devices by transmitting the audio timestamp from the media device to the at least one audio device in the group of media devices.

2. The method of claim 1, further comprising determining whether to present the audio content of the media content item on the audio component of the media device and the at least one audio device.

3. The method of claim 2, further comprising inhibiting the audio content associated with the media content item from being presented on the media device in response to determining that the audio content of the media content item is to be presented on the at least one audio device.

4. The method of claim 2, wherein the audio content is presented on the media device using the generated audio timestamp and wherein the audio timestamp is transmitted to the at least one audio device in response to determining that the audio content of the media content item is to be presented on the audio component of the media device and the at least one audio device.

5. The method of claim 1, further comprising:
receiving an indication of a change in playback of the media content item; and
in response to receiving the indication of the change in playback, causing presentation of the video content associated with the media content item on the media device and the presentation of audio content associated with the media content item by the at least one audio device in the group of media devices to be modified based on the indication by generating an updated audio timestamp that is transmitted to the at least one audio device in the group of audio devices and by generating an updated video timestamp based on the updated audio timestamp.

6. The method of claim 5, wherein the change in playback of the media content item is a change in a playback position of the media content item.

7. The method of claim 5, wherein the change in playback of the media content item is a change in a volume of the audio content associated with the media content item.

8. The method of claim 1, wherein the audio timestamp is generated based on a current audio timestamp, a duration of time that has elapsed since presentation of the media content item began on the media device, and a sampling rate of the audio content associated with the media content item.

9. The method of claim 1, further comprising:
detecting a plurality of media devices having at least one of audio playback capabilities and video playback capabilities; and
causing a user interface for selecting one or more of the plurality of detected media devices to be presented, wherein a subset of media devices that are selected from the plurality of media devices are placed in the group of media devices.

10. A system for synchronizing audio and video content, the system comprising:

a memory; and
a hardware processor coupled to the memory that is programmed to:
receive, at a media device, an indication of a media content item to be presented using the media device, wherein the media device includes an audio component for presenting audio content associated with the media content item and a video component for presenting video content associated with the media content item;
determine that the media device is associated with a group of media devices for presenting the media content item, wherein the group of media devices includes the media device and at least one audio device that presents the audio content associated with the media content item;
generate, by the media device, an audio timestamp that controls the presentation of the audio content on the group of media devices;
generate, by the media device, a video timestamp that control the presentation of the video content on the media device based on the generated audio timestamp in response to setting the audio component of the media device as a master device and the at least one audio device in the group of media devices as a follower device; and
cause, at the media device, the video content associated with the media content item to be presented using the generated video timestamp and causing the audio content associated with the media content item to be simultaneously presented by the at least one audio device in the group of media devices by transmitting the audio timestamp from the media device to the at least one audio device in the group of media devices.

11. The system of claim 10, wherein the hardware processor is further programmed to determine whether to present the audio content of the media content item on the audio component of the media device and the at least one audio device.

12. The system of claim 11, wherein the hardware processor is further programmed to inhibit the audio content associated with the media content item from being presented on the media device in response to determining that the audio content of the media content item is to be presented on the at least one audio device.

13. The system of claim 11, wherein the audio content is presented on the media device using the generated audio timestamp and wherein the audio timestamp is transmitted to the at least one audio device in response to determining that the audio content of the media content item is to be presented on the audio component of the media device and the at least one audio device.

14. The system of claim 10, wherein the hardware processor is further programmed to:
receive an indication of a change in playback of the media content item; and
in response to receiving the indication of the change in playback, cause presentation of the video content associated with the media content item on the media device and the presentation of audio content associated with the media content item by the at least one audio device in the group of media devices to be modified based on the indication by generating an updated audio timestamp that is transmitted to the at least one audio device in the group of audio devices and by generating an updated video timestamp based on the updated audio timestamp.

15. The system of claim 14, wherein the change in playback of the media content item is a change in a playback position of the media content item.

16. The system of claim 14, wherein the change in playback of the media content item is a change in a volume of the audio content associated with the media content item.

17. The system of claim 10, wherein the audio timestamp is generated based on a current audio timestamp, a duration of time that has elapsed since presentation of the media content item began on the media device, and a sampling rate of the audio content associated with the media content item.

18. The system of claim 10, wherein the hardware processor is further programmed to:
detect a plurality of media devices having at least one of audio playback capabilities and video playback capabilities; and
cause a user interface for selecting one or more of the plurality of detected media devices to be presented, wherein a subset of media devices that are selected from the plurality of media devices are placed in the group of media devices.

19. A non-transitory computer-readable medium containing computer executable instructions that, when executed by a processor, cause the processor to perform a method for synchronizing audio and video content, the method comprising:
receiving, at a media device, an indication of a media content item to be presented using the media device, wherein the media device includes an audio component for presenting audio content associated with the media content item and a video component for presenting video content associated with the media content item;
determining that the media device is associated with a group of media devices for presenting the media content item, wherein the group of media devices includes the media device and at least one audio device that presents the audio content associated with the media content item;
generating, by the media device, an audio timestamp that controls the presentation of the audio content on the group of media devices;
generating, by the media device, a video timestamp that controls the presentation of the video content on the media device, wherein the video timestamp is based on the generated audio timestamp in response to setting the audio component of the media device as a master device and the at least one audio device in the group of media devices as a follower device; and
causing, at the media device, the video content associated with the media content item to be presented using the generated video timestamp and causing the audio content associated with the media content item to be simultaneously presented by the at least one audio device in the group of media devices by transmitting the audio timestamp from the media device to the at least one audio device in the group of media devices.

* * * * *